United States Patent
Sato (10) Patent No.: US 10,848,045 B2
(45) Date of Patent: Nov. 24, 2020

(54) SOUND PRODUCTION DEVICE

(71) Applicant: ALPS ALPINE CO., LTD., Ota-ku, Tokyo (JP)

(72) Inventor: Kiyoshi Sato, Niigata-Ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/169,582

(22) Filed: Oct. 24, 2018

(65) Prior Publication Data

US 2019/0068038 A1 Feb. 28, 2019

Related U.S. Application Data (63) Continuation of application No. PCT/JP2017/007132, filed on Feb. 24, 2017.

(30) Foreign Application Priority Data

May 12, 2016 (JP) ................. 2016-096210

(51) Int. Cl.
*H02K 33/12* (2006.01)
*H04R 11/02* (2006.01)
*H02K 33/18* (2006.01)
*H04R 7/20* (2006.01)

(52) U.S. Cl.
CPC ............ *H02K 33/12* (2013.01); *H02K 33/18* (2013.01); *H04R 11/02* (2013.01); *H04R 7/20* (2013.01)

(58) Field of Classification Search
CPC ................ H04R 9/025; H04R 9/027
USPC ................................. 381/417–418
See application file for complete search history.

(56) References Cited

U.S. PATENT DOCUMENTS

| | | | |
|---|---|---|---|
| 6,658,134 B1 | 12/2003 | van Hal et al. | |
| 7,336,797 B2 | 2/2008 | Thompson et al. | |
| 9,432,774 B2 * | 8/2016 | Bolsman ............... | H04R 11/02 |
| 2016/0183004 A1 * | 6/2016 | Jiles ...................... | H04R 11/02 |
| | | | 381/418 |

FOREIGN PATENT DOCUMENTS

JP 2015-139041 7/2015

OTHER PUBLICATIONS

International Search Report issued in PCT/JP2017/007132, dated Apr. 11, 2017.

* cited by examiner

*Primary Examiner* — Suhan Ni
(74) *Attorney, Agent, or Firm* — Hunton Andrews Kurth LLP (57) ABSTRACT

An armature is vibrated by a magnetic field generating unit and a coil. A diaphragm is driven by the armature. In the magnetic field generating unit, a first protective layer is provided on the magnetized surface of a first magnet, and a second protective layer is provided on the magnetized surface of a second magnet. Since protective layers with a certain thickness are present, it is possible to prevent the armature from being left attracted to the first magnet or second magnet.

6 Claims, 6 Drawing Sheets

FIG. 6

SOUND PRODUCTION DEVICE

CLAIM OF PRIORITY

This application is a Continuation of International Application No. PCT/JP2017/007132 filed on Feb. 24, 2017, which claims benefit of Japanese Patent Application No. 2016-096210 filed on May 12, 2016. The entire contents of each application noted above are hereby incorporated by reference.

BACKGROUND OF THE INVENTION

1. Field of the Invention

The present invention relates to a sound production device that drives an armature formed from a metal plate made of a magnetic material to vibrate a diaphragm.

2. Description of the Related Art

PCT Japanese Translation Patent Publication No. 8-502635 describes an invention related to an electroacoustic transducer.

In this electroacoustic transducer, a magnet is fixed to each of the inner opposing surfaces of magnetic poles that oppose each other vertically, and a coil is fixed to a side of the magnet. A lead armature passes through the interior of the tunnel of the coil and is placed in space between coils that oppose each other vertically. The lead armature is attached to a diaphragm.

This electroacoustic transducer converts the vibration of the diaphragm, the vibration resulting from a received sound, to a current corresponding to the vibration, and vice versa.

In the invention described in PCT Japanese Translation Patent Publication No. 8-502635, a restricting body that restricts the deviation of the lead armature is provided to prevent damage that would otherwise be caused when, for example, the electroacoustic transducer drops and is subject to a shock.

As the restricting body described above, a molded body is provided by deforming part of the lead armature into a hemispherical form or by attaching a mass of adhesive to part of the lead armature. When this type of molded body is positioned in the tunnel, the deviation of the lead armature is restricted. Alternatively, a spacer is placed between the magnetic pole and the coil. The lead armature is passed through an opening formed in the spacer to restrict the deviation of the lead armature.

In the electroacoustic transducer described in PCT Japanese Translation Patent Publication No. 8-502635, a restricting body is provided in the tunnel of the coil or between the magnetic pole and the coil. Therefore, it is possible to restrict the deviation of the lead armature at an intermediate point between the magnetic pole and the coil.

However, the deviation of the lead armature positioned in space between the opposing magnets cannot be restricted. Therefore, when a large shock is exerted, for example, the lead armature comes into contact with the magnetic pole surface of the magnet and remains attracted to the magnetic pole surface of the magnet due to a magnetic force. This may cause an operation failure. In assembling work as well, the lead armature may be attracted to the magnetic pole surface during the insertion of the lead armature into the space between the opposing magnets. This may impair the assembling work.

SUMMARY OF THE INVENTION

The present invention addresses the conventional problem described above by providing a sound production device that can reduce a force which an armature is attracted to a magnet when the armature causes a large runout in space between opposing magnets.

A sound production device in the present invention has an armature made of a magnetic material, the armature vibrating in a plate thickness direction with the bottom of the armature supported, a driving mechanism configured to vibrate the armature, and a diaphragm vibrated by the armature.

The driving mechanism has a first magnet facing a surface of one plate of the armature, a second magnet facing a surface of another plate of the armature, and a yoke configured to hold the first magnet and the second yoke.

A magnetized surface of the first magnet, the magnetized surface facing the armature, and a magnetized surface of the second magnet, the magnetized surface facing the armature, have different magnetic poles. A non-magnetic protective layer is provided on at least part of each of the magnetized surfaces.

In the sound production device in the present invention, the armature can preferably maintain a neutral attitude distant from the two magnetized surfaces with the elastic force of the armature itself.

The thickness of the protective layers is preferably determined so that when the armature comes into contact with either of the protective layers, a force with which the armature returns to the neutral position with the elastic force is larger than a force with which the magnet attracts the armature.

In the sound production device in the present invention, each magnetized surface preferably has a top edge facing the free end of the armature and a rear edge facing the bottom side of the armature. The protective layers are preferably disposed within a predetermined range starting from the top edge in the backward direction.

In the sound production device in the present invention, the protective layer is preferably a resin layer.

In the sound production device in the present invention, the protective layer provided on the magnetized surface of the first magnet and the protective layer provided on the magnetized surface of the second magnet are preferably colored in different hues.

In the sound production device in the present invention, a non-magnetic protective layer is provided on at least part of the magnetized surface of a magnet. Even if the armature causes a large runout due to a shock or the like, the armature comes into contact with the non-magnetic protective layer without coming into direct contact with the magnetized surface. This can restrain the armature from being attracted to the magnetized surface. In assembling work as well, it is possible to prevent the armature from being attracted to the magnetized surface.

The protective layer also has a function to protect the magnet from a shock. Furthermore, when each protective layer is colored in a different hue according to the magnetic pole of the magnetized color, it is possible to prevent magnets from being incorporated in a wrong combination.

DESCRIPTION OF THE PREFERRED EMBODIMENTS

Figure 1:
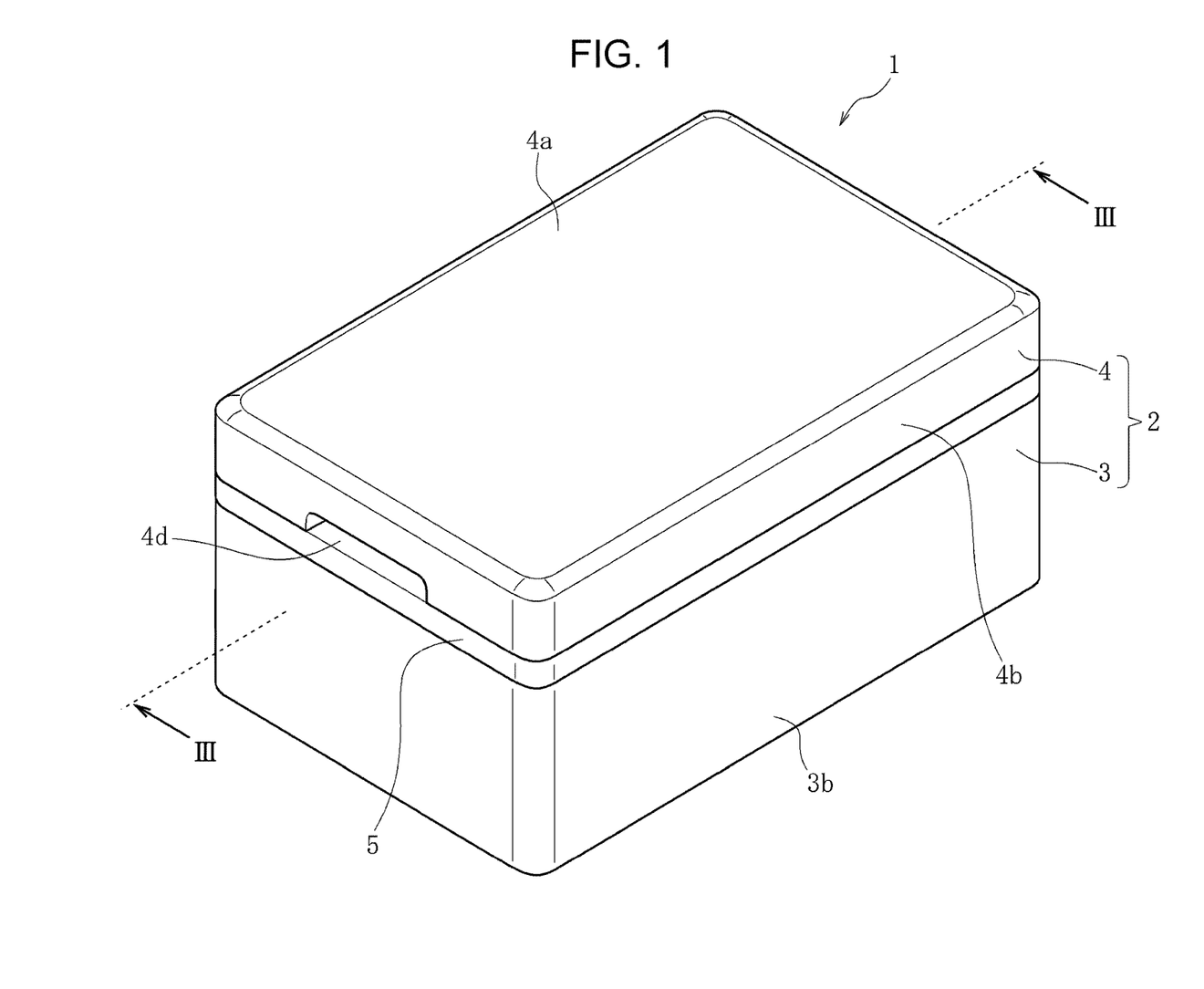
FIG. 1 is a perspective view illustrating the outside shape of a sound production device in an embodiment of the present invention.
Figure 2:
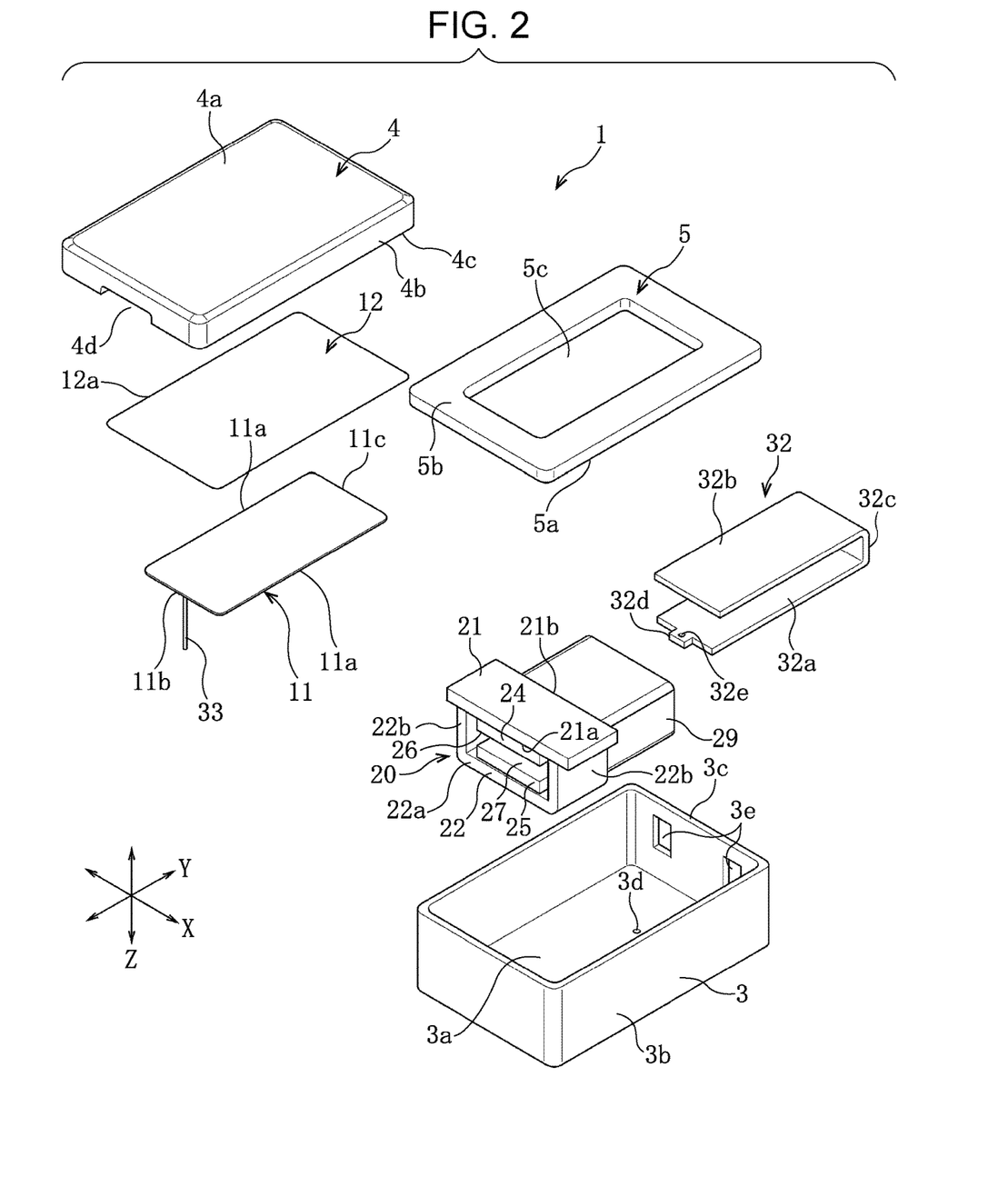
FIG. 2 is an exploded perspective view of the sound production device illustrated in FIG. 1.

A sound production device 1 in an embodiment of the present invention has a case 2. The case 2 is composed of a lower case 3 and an upper case 4 as illustrated in FIGS. 1 and 2. The lower case 3 and upper case 4 are formed from a synthetic resin or in a die casting method in which a non-magnetic material or a magnetic metal material is used. Alternatively, the lower case 3 and upper case 4 are formed by stamping a non-magnetic or magnetic metal plate.

The lower case 3 has a bottom part 3a, a side wall part 3b that encloses four side surfaces, and an opening edge part 3c at the upper end of the side wall part 3b, as illustrated in FIG. 2. The upper case 4 has a top part 4a, a side wall part 4b that encloses four side walls, and an opening edge part 4c at the upper end of the side wall part 4b. The inner space of the lower case 3 is larger than the inner space of the upper case 4, so the upper case 4 functions as a lid of the lower case 3.

Figure 3:
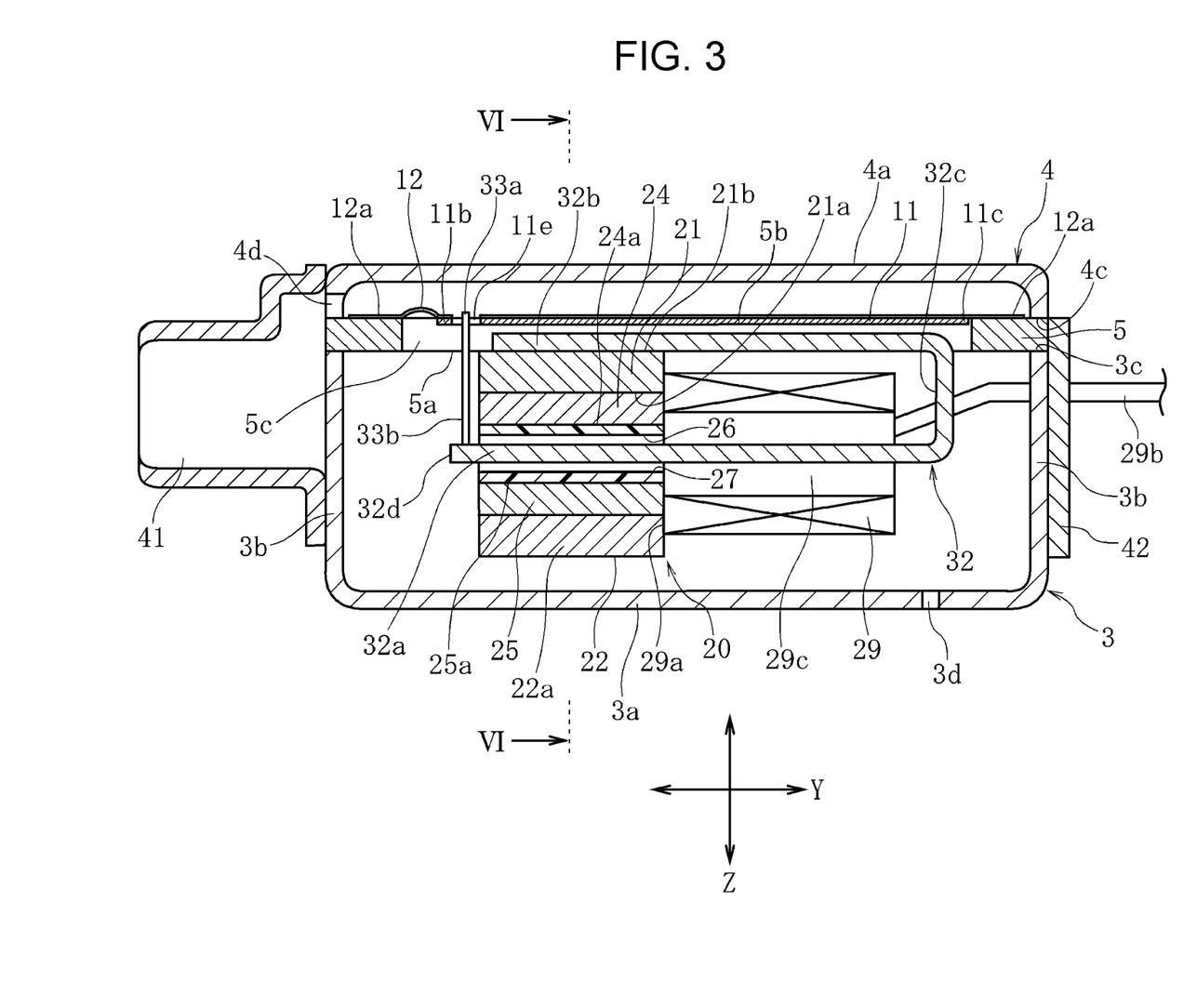
FIG. 3 is a cross-sectional view of the sound production device illustrated in FIG. 1 as taken along line III-III.
Figure 6:
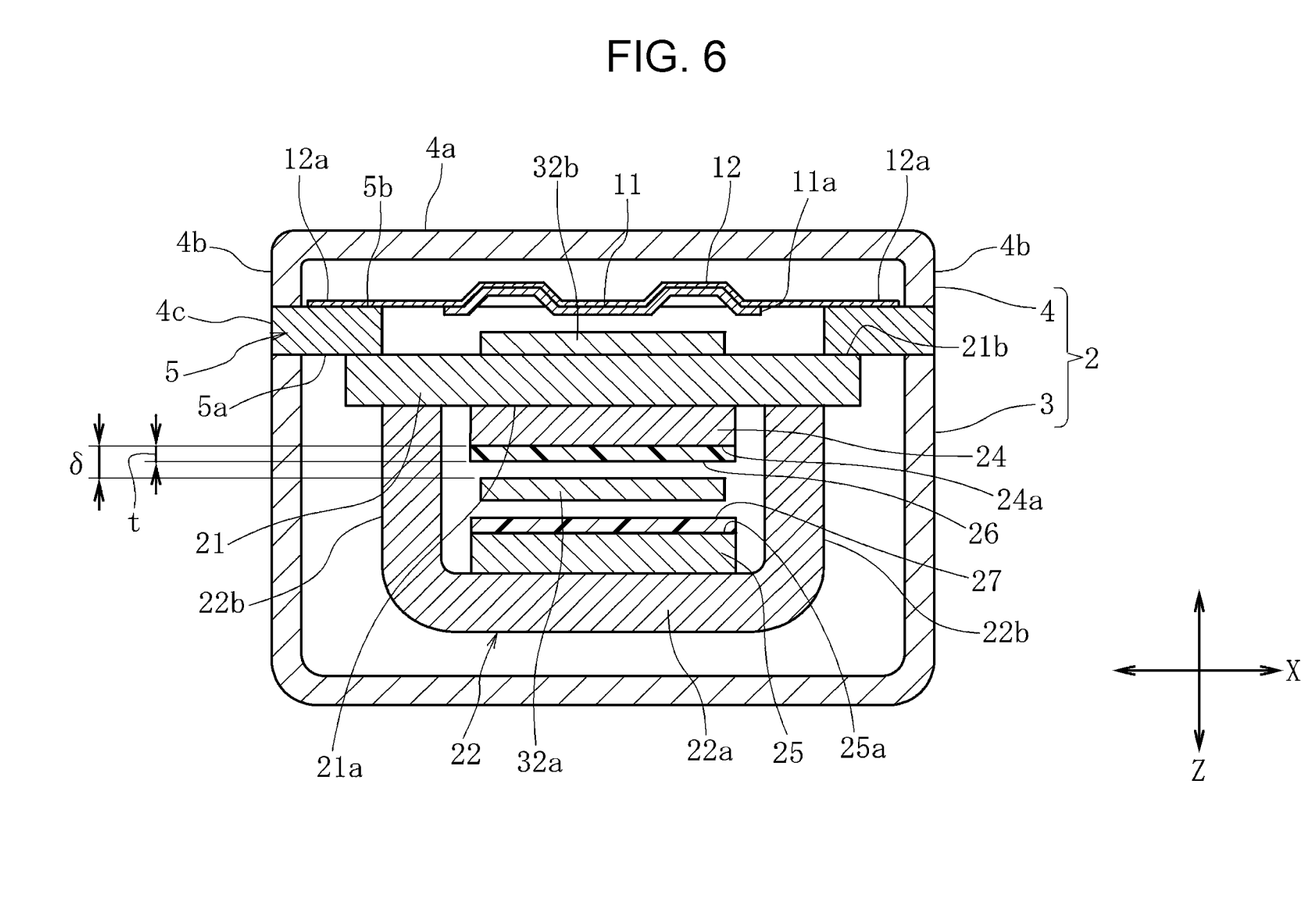
FIG. 6 is a cross-sectional view taken along line VI-VI in FIG. 3.

A frame 5 is interposed between the opening edge part 3c of the lower case 3 and the opening edge part 4c of the upper case 4 as illustrated in FIGS. 3 and 6. In a state in which the lower case 3, upper case 4, and frame 5 are combined together and positioned, laser welding is performed for them to fix the lower case 3 and frame 5 to each other and fix the upper case 4 and frame 5 to each other.

Figure 5:
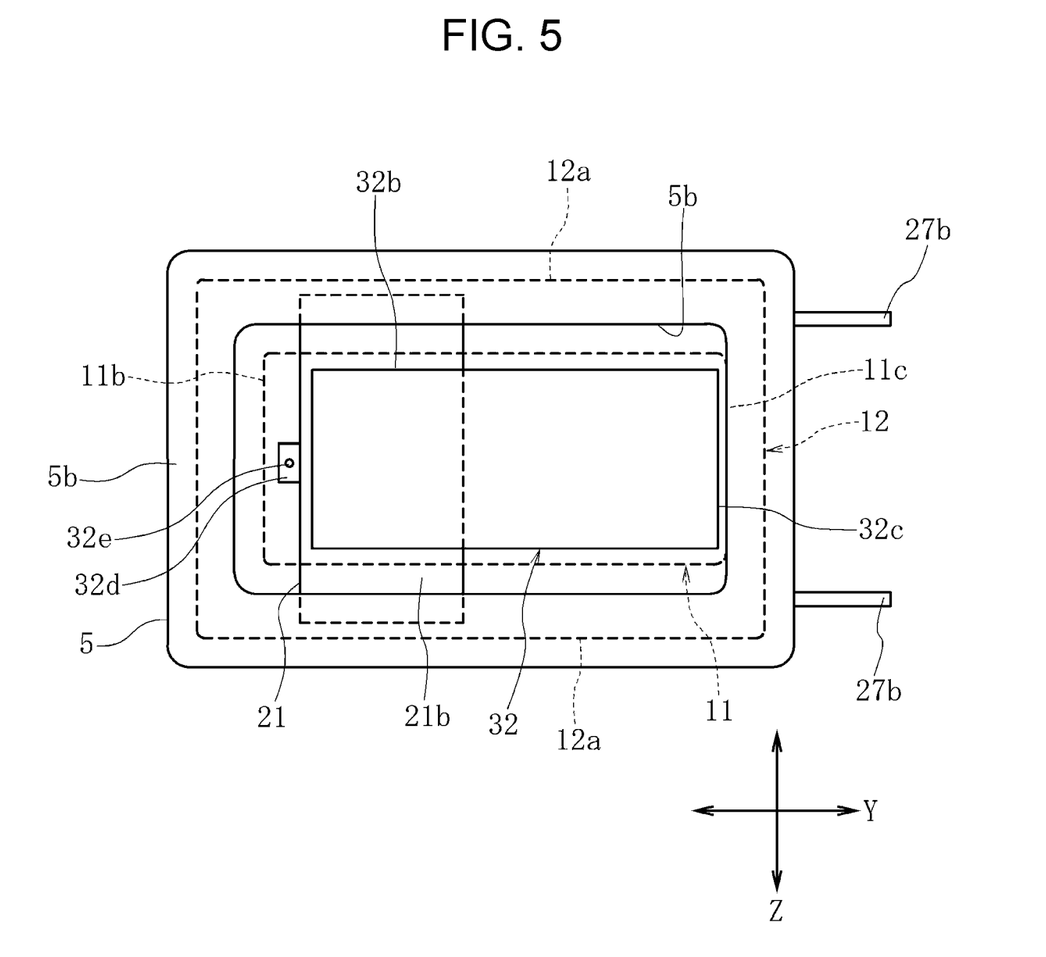
FIG. 5 is a plan view illustrating a state in which a diaphragm, an upper yoke, and an armature are attached to a frame.

The frame 5 is formed from a non-magnetic metal plate having a uniform thickness in the Z direction, as illustrated in FIG. 2. A flat surface, on the lower side in the drawing, of the frame 5 is a driving-side attachment surface 5a, and a flat surface, on the upper side in the drawing, of the frame 5 is a vibration-side attachment surface 5b. As illustrated in FIG. 5 as well, an opening 5c is formed at the central portion of the frame 5 so as to pass through the frame 5 vertically. The opening 5c is a rectangular hole.

Figure 4:
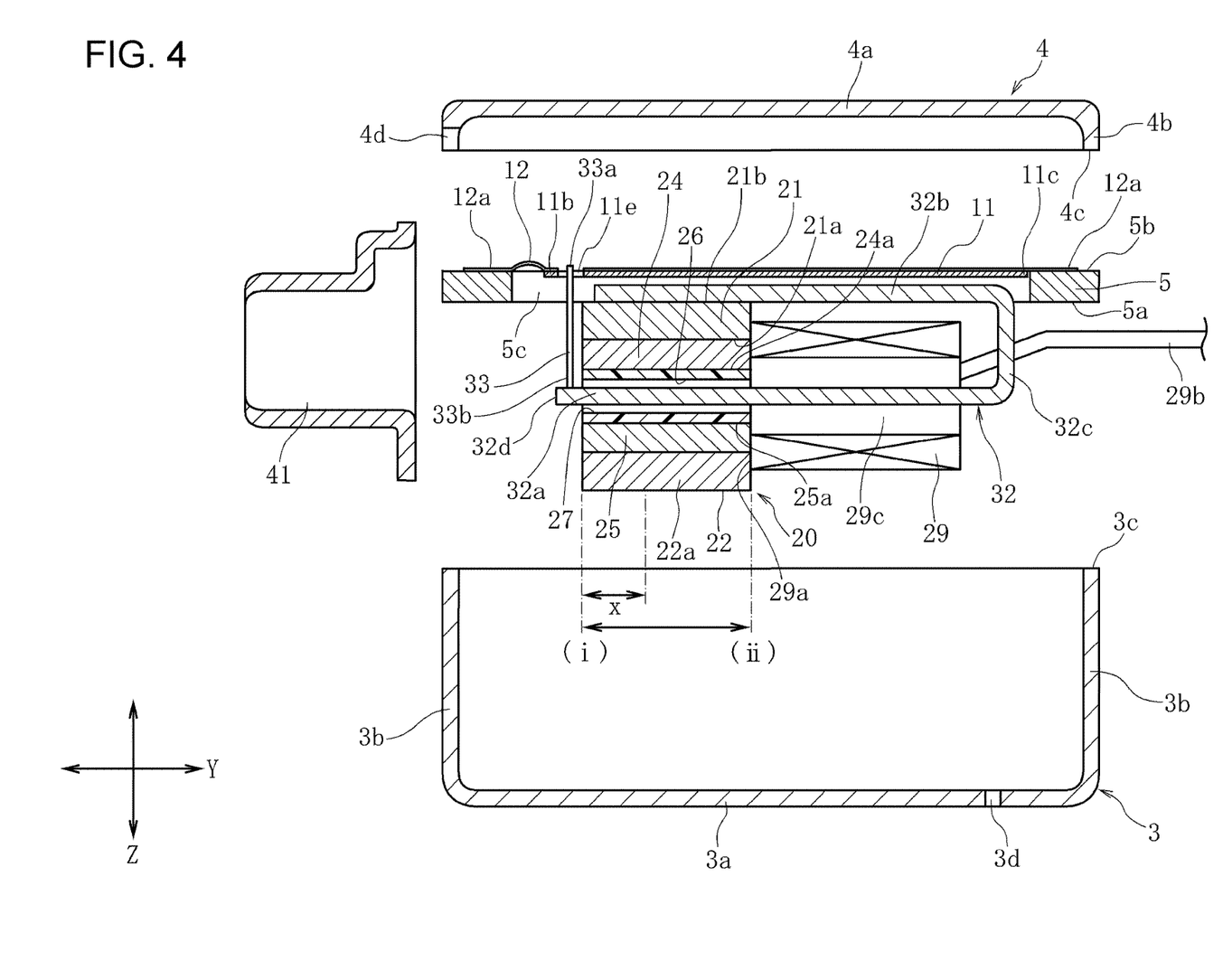
FIG. 4 is a cross-sectional view illustrating work to assemble the sound production device illustrated in FIG. 3.

A diaphragm 11 and a flexible sheet 12 are attached to the frame 5 as illustrated in FIGS. 3 and 4. The diaphragm 11 is formed from a thin metal material such as an aluminum material or SUS304. To increase bending strength, the diaphragm 11 has ribs formed by press molding as necessary. The flexible sheet 12, which is easier to warp than the diaphragm 11, is formed from, for example, a resin sheet or resin film made of polyethylene terephthalate (PET), nylon, polyurethane, or the like.

The diaphragm 11 is bonded and fixed to the lower surface of the flexible sheet 12, and the outer circumference 12a of the flexible sheet 12 is fixed to the vibration-side attachment surface 5b, which is the upper surface of the frame of the frame 5, with an adhesive, as illustrated in FIG. 6. As a result, the diaphragm 11 is supported by the frame 5 with the flexible sheet 12 intervening between them so as to freely vibrate. The area of the diaphragm 11 is smaller than the area of the opening 5c of the frame 5 and the area of the flexible sheet 12 is larger than the area of the diaphragm 11, as illustrated in FIGS. 5 and 6. When the flexible sheet 12 is warped, the diaphragm 11 can vibrate due to the elasticity of the flexible sheet 12 so that the free end 11b deviates in the Z direction with a fulcrum-side end 11c acting as a fulcrum.

A magnetic field generating unit 20 is attached to the driving-side attachment surface 5a of the frame 5 as illustrated in FIGS. 3, 4, and 5. The magnetic field generating unit 20 has an upper yoke 21 and a lower yoke 22 as illustrated in FIG. 2. The upper yoke 21 and lower yoke 22 are formed from a magnetic material. Specifically, they are formed from, for example, a Ni—Fe alloy or a steel plate such as a cold-rolled steel plate typified by SPCC.

The lower yoke 22 is bent in a U-shape as illustrated in FIG. 2 and has a bottom surface part 22a and a pair of side surface parts 22b, each of which is bent upward at one end in the X direction. The upper end of each side surface part 22b is joined to the inner surface 21a of the upper yoke 21, which is shaped like a flat plate. The upper yoke 21 and lower yoke 22 are fixed to each other by laser spot welding or the like. When the upper yoke 21 and lower yoke 22 are fixed to each other, the inner side of the bottom surface part 22a of the lower yoke 22 and the inner surface 21a of the upper yoke 21 oppose each other in parallel.

In the magnetic field generating unit 20, a first magnet 24 is fixed to the inner surface 21a of the upper yoke 21 and a second magnet 25 is fixed to the inner side of the bottom surface part 22a of the lower yoke 22, as illustrated in FIGS. 2 to 4 and 6. The first magnet 24 and second magnet 25 are magnetized so that the magnetized surface 24a of the first magnet 24 and the magnetized surface 25a of the second magnet 25 have mutually opposite polarities.

A first protective layer 26 is provided on the magnetized surface 24a of the first magnet 24. A second protective layer 27 is provided on the magnetized surface 25a of the second magnet 25. The first protective layer 26 and second protective layer 27 are formed from a non-magnetic material. The first protective layer 26 and second protective layer 27, which are, for example, a resin film made of a PET or acrylic resin, are respectively fixed to the magnetized surfaces 24a and 25a with an adhesive. Alternatively, the first protective layer 26 and second protective layer 27 may be a resin layer attached to the magnetized surface 24a or 25a, whichever is appropriate, in a coating process or a dipping process. Alternatively, the first protective layer 26 and second protective layer 27 may be an inorganic material layer attached to the magnetized surface 24a or 25a, whichever is appropriate, in an evaporation process or a sputtering process. Furthermore, the first protective layer 26 and second protective layer 27 may be formed from a metal foil or metal plate made of a non-magnetic metal material.

The first protective layer 26 and second protective layer 27 are preferably colored in different hues. For example, a protective layer provided on the N-pole magnetized surface, which is one of the two magnetized surfaces, 24a and 25a, is colored in blue and a protective layer provided on the S-pole magnetized surface, which is the other of the two magnetized surfaces, is colored in red. When the first protective layer 26 and second protective layer 27 are colored in different hues, it is easy to identify the first magnet 24 on which the first protective layer 26 is provided and the second magnet 25 on which the second protective layer 27 is provided during assembling work. This prevents the first magnet 24 and second magnet 25 from being attached upside down and eliminating other problems in an embodiment illustrated in FIG. 6 and other drawings.

A coil 29 is provided at a position next to the magnetic field generating unit 20 as illustrated in FIGS. 2 and 3. The coil 29 is formed by winding conductors around a winding axis extending in the Y direction. The coil 29 has a bonding surface 29a, which is an end surface facing the left side in the Y direction, as illustrated in FIGS. 2 and 3. This bonding surface 29a is fixed to side surfaces, facing in the Y direction, of the upper yoke 21 and lower yoke 22 of the magnetic field generating unit 20 with an adhesive or the like. At that time, the coil 29 is positioned so that the central line of the windings of the coil 29 in the Z direction matches the center of space between the first magnet 24 and second magnet 25, which are opposite to each other, in the Z direction, after which the coil 29 and first magnet 24 are fixed to each other and the coil 29 and second magnet 25 are fixed to each other.

An armature 32 is provided in the sound production device 1 as illustrated in FIGS. 2 and 3. The armature 32 is formed from a magnetic plate having a uniform thickness, such as, for example, a Ni—Fe alloy. The armature 32 is formed by stamping and bending in a U-shape having a movable part 32a, a fixed part 32b, and a bent part 32c. A top 32d, facing in the Y direction (on the free-end side), of the movable part 32a of the armature 32 has a width reduced in the X direction, and a linking hole 32e is formed in the top 32d so as to pass through it vertically, as illustrated in FIG. 2.

The fixed part 32b of the armature 32 is fixed to a bonding surface 21b, which is an upward external surface of the upper yoke 21 as illustrated in FIGS. 3, 4, and 5. The movable part 32a of the armature 32 is inserted into the interior of the space 29c of the coil 29 and is further inserted into space between the first magnet 24 and the second magnet 25, that is, between the first protective layer 26 and the second protective layer 27. The top 32d of the armature 32 protrudes from the interior of the space between the first protective layer 26 and the second protective layer 27 toward the left side in the drawings.

The bonding surface 21b, which is the upper surface of the upper yoke 21, is joined to the driving-side attachment surface 5a, which is the lower surface of the frame 5, as illustrated in FIGS. 3 and 4. The upper yoke 21 is placed so as to traverse the opening 5c in the frame 5 in the X direction and both ends of the upper yoke 21 in the X direction are joined to the driving-side attachment surface 5a of the frame 5, as illustrated in FIG. 6. In this state, the upper yoke 21 and frame 5 are fixed to each other by laser spot welding or the like.

The area of the fixed part 32b of the armature 32 is smaller than the area of the opening 5c of the frame 5 as illustrated in FIG. 5. When the bonding surface 21b of the upper yoke 21 is fixed directly to the driving-side attachment surface 5a, which is the lower surface of the frame 5, therefore, the fixed part 32b, fixed to the bonding surface 21b, of the armature 32 enters the interior of the opening 5c in the frame 5, as illustrated in FIGS. 3 and 6. The thickness of the fixed part 32b in the Z direction is smaller than the thickness of the frame 5 in the Z direction. Therefore, a gap is provided in the Z direction between the fixed part 32b of the armature 32 and the diaphragm 11, which is also positioned in the opening 5c, so that the diaphragm 11 can vibrate in the Z direction.

The free end 11b of the diaphragm 11 and the top 32d of the armature 32 are linked together with a transmission body 33 as illustrated in FIGS. 3, 4, and 5. The transmission body 33 is a needle-like member formed from a metal or synthetic resin. For example, the transmission body 33 is formed from a pin material made of SUS202. The upper end 33a of the transmission body 33 is inserted into an attachment hole 11e formed in the diaphragm 11, after which the diaphragm 11 and transmission body 33 are fixed to each other with an adhesive or by soldering. The lower end 33b of the transmission body 33 is inserted into the linking hole 32e formed in the top 32d of the armature 32, after which the transmission body 33 and top 32d are fixed to each other by laser welding or soldering or with an adhesive. The transmission body 33 traverses the interior of the opening 5c in the frame 5 vertically. Part of the transmission body 33 is positioned in the interior of the opening 5c.

In this embodiment, the magnetic field generating unit 20, armature 32, and transmission body 33 constitute a driving mechanism that drives the diaphragm 11.

The plate surface of the movable part 32a of the armature 32, the plate surface facing upward in the relevant drawing, is opposite to the first protective layer 26, which covers the magnetized surface 24a of the first magnet 24. The plate surface of the movable part 32a, the plate surface facing downward in the relevant drawing, is opposite to the second protective layer 27, which covers the magnetized surface 25a of the second magnet 25. In FIG. 6, the distance between the magnetized surface 24a of the first magnet 24 and the plate surface of the movable part 32a of the armature 32, the plate surface facing upward in the drawing, is denoted 6, and the thickness of the first protective layer 26 is denoted t. In terms of design, the first magnet 24 on the upper side and the second magnet 25 on the lower side are vertically symmetric with respect to the movable part 32a. Therefore, the distance between the magnetized surface 25a of the second magnet 25 and the plate surface of the movable part 32a, the plate surface facing downward in the drawing, is also 6 and the thickness of the second protective layer 27 is also t.

The distance δ is 0.06 to 0.15 mm. The thickness t of the protective layers 26 and 27 is set to a value large enough that when the movable part 32a of the armature 32 deviates upward and comes into contact with the lower surface of the first protective layer 26 and the attractive force of the first magnet 24 is exerted on the movable part 32a, the movable part 32a can return to a neutral attitude that enables the movable part 32a to move away from the first protective layer 26 with the elastic force of the armature 32 itself without maintaining a state in which the movable part 32a is attracted to the first protective layer 26. This is also true for a relationship between the movable part 32a and the second protective layer 27. The thickness t is, for example, 0.025 to 0.115 mm.

FIG. 4 illustrates the positions of the top edge (i) on the free end side (on the same side as the top 32d) of the armature 32 and the rear edge (ii) at the bottom side of the armature 32, the positions being on the magnetized surface 24a of the first magnet 24 and the magnetized surface 25a of the second magnet 25. The first protective layer 26 and second protective layer 27 are disposed within a range indicated by X, starting from the top edge (i) toward the bottom side. If the length from the top edge (i) to the rear edge (ii) is L, X/L is preferably at least one-third and at most 1. Since the armature 32 is warped (is bent) so that the top 32d, which is a free end, moves vertically with the bent part 32c acting as a fulcrum, the movable part 32a easily comes into contact with the upper and lower magnets at the top edge (i). Therefore, the first protective layer 26 and second protective layer 27 are preferably disposed at least around the top edge (i) or within a predetermined range (range X) starting from the top edge (i) in the backward direction.

The outer peripheral of the frame 5 is fixed by being interposed between the opening edge part 3c of the lower case 3 and the opening edge part 4c of the upper case 4, as illustrated in FIGS. 3 and 5. When the frame 5 is fixed by being interposed between the lower case 3 and the upper case 4, internal space in the case 2 is divided into upper space and lower space by the diaphragm 11 and flexible sheet 12. Inner space, in the upper case 4, that is above the diaphragm 11 and flexible sheet 12 is sound production space. The sound production space communicates with external space through a sound production port 4d formed in the side wall part 4b of the upper case 4.

A sound production nozzle 41 communicating with the sound production port 4d is fixed to the outer portion of the case 2 as illustrated in FIG. 3. An intake and exhaust port 3d is formed at the bottom of the lower case 3 as illustrated in FIGS. 2 and 3. Inner space, in the lower case 3, that is below the diaphragm 11 and flexible sheet 12 communicates with the outside through the intake and exhaust port 3d. A pair of wiring holes 3e are formed in the side wall part 3b of the lower case 3 as illustrated in FIG. 2. A pair of terminals 29b of the conductors constituting the coil 29 are led out from the wiring holes 3e to the outside, as illustrated in FIG. 3. A board 42 is fixed to the outer portion of the side wall part 3b. When each terminal 29b passes through a small hole formed in the board 42, the small hole is blocked, the relevant wiring hole 3e is shut out from the outside.

The sound production device 1 is assembled as described below.

In the sound production device 1, individual parts are incorporated with respect to the frame 5, as illustrated in FIG. 4. The diaphragm 11 is overlaid and joined to the lower surface of the flexible sheet 12. The outer circumference 12a of the flexible sheet 12 is bonded and fixed to the vibration-side attachment surface 5b, which is the upper surface of the frame 5.

In work to assemble the magnetic field generating unit 20, the first magnet 24 is joined to the inner surface 21a of the upper yoke 21 and the second magnet 25 is joined to the upper surface of the bottom surface part 22a of the lower yoke 22, after which the upper yoke 21 and lower yoke 22 are fixed to each other by laser spot welding or the like. The bonding surface 29a of the coil 29 is fixed to the side surfaces, facing in the Y direction, of the upper yoke 21 and lower yoke 22 with an adhesive. At that time, the first protective layer 26 provided on the magnetized surface 24a of the first magnet 24 and the second protective layer 27 provided on the magnetized surface 25a of the second magnet 25 are colored in different hues. For example, the N-pole side is colored in blue and the S-pole side is colored in red. This assures that the first magnet 24 and second magnet 25 are correctly attached to the upper and lower positions.

The armature 32 is formed by stamping to form the bent part 32c so that the movable part 32a and fixed part 32b face each other in parallel in the Z direction. The movable part 32a of the armature 32 is inserted into the space 29c at the center between the windings of the coil 29 and the space between the first protective layer 26 and second protective layer 27, which are opposite to each other. The fixed part 32b is brought into contact with the bonding surface 21b, which is the upper surface of the upper yoke 21, and is fixed by laser spot welding or the like.

The movable part 32a may come into contact with the surface of the first protective layer 26 or second protective layer 27 at that time. Even in this case, since a distance equivalent to the thickness t of the first protective layer 26 is left between the magnetized surface 24a and the plate surface of the movable part 32a, the plate surface facing the magnetized surface 24a, a force with which the movable part 32a is attracted to the first protective layer 26 with the magnetic force of the magnetized surface 24a is attenuated. Similarly, since a distance equivalent to the thickness t of the second protective layer 27 is left between the magnetized surface 25a and the plate surface of the movable part 32a, the plate surface facing the magnetized surface 25a, a force with which the movable part 32a is attracted to the second protective layer 27 with the magnetic force of the magnetized surface 25a is attenuated. Therefore, at a point in time when the fixed part 32b is fixed to the upper yoke 21, the movable part 32a exerts its elastic force, enabling the movable part 32a to move away from the first protective layer 26 or second protective layer 27 and return to a neutral attitude.

Next, a partial assembly in which the coil 29 and armature 32 are incorporated into the magnetic field generating unit 20 composed of the yokes 21 and 22 and magnets 24 and 25 is fixed to the driving-side attachment surface 5a of the frame 5. The bonding surface 21b of the upper yoke 21 is brought into contact with the driving-side attachment surface 5a of the frame 5 and is fixed by laser welding or the like. At that time, the fixed part 32b of the armature 32 fixed to the upper yoke 21 enters the interior of the opening 5c in the frame 5.

After the magnetic field generating unit 20, coil 29, and armature 32 have been attached to the driving-side attachment surface 5a, the diaphragm 11 and the top 32d of the movable part 32a of the armature 32 are linked with the transmission body 33.

Then, the circumference of the frame 5 is interposed between the opening edge part 3c of the lower case 3 and the opening edge part 4c of the upper case 4, after which the lower case 3, frame 5, and upper case 4 are fixed together by laser spot welding or with an adhesive. The terminal 29b of the conductor of the coil 29 is led out from the wiring hole 3e in the lower case 3 to the outside, and the wiring hole 3e is covered with the board 42. The sound production nozzle 41 is fixed to the case 2. This completes the assembling work.

Next, the operation of the sound production device 1 will be described.

When a voice current is given to the coil 29, a magnetic field is induced in the armature 32. The magnetic field induced in the armature 32 and a magnetic field generated between the magnetized surface 24a of the first magnet 24 and the magnetized surface 25a of the second magnet 25 cause the movable part 32a of the armature 32 to vibrate in the Z direction. This vibration is transmitted to the diaphragm 11 through the transmission body 33. The free end 11b of the diaphragm 11 supported by the flexible sheet 12 causes a runout in the Z direction with the fulcrum-side end 11c acting as a fulcrum and vibrates. This vibration is transmitted to the diaphragm 11, generating a sound pressure in the sound production space in the interior of the upper case 4. This sound pressure is output from the sound production port 4d to the outside.

The movable part 32a of the armature 32 may come into contact with the lower surface of the first protective layer 26 or the upper surface of the second protective layer 27 due to, for example, a shock applied from the outside to the sound production device 1. Even in this case, a force with which the first magnet 24 or second magnet 25 attracts the movable part 32a can be reduced because the protective layers 26 and 27 with a thickness of t are present, enabling the movable part 32a to return to a neutral attitude with the elastic force of the movable part 32a itself. Therefore, it is possible to prevent the movable part 32a from being left attracted to the magnet 24 or 25.

What is claimed is:

1. A sound production device comprising:
an armature made of a magnetic material, the armature having first and second plates and vibrating in a plate thickness direction with a bottom of the armature supported;
a driving mechanism configured to vibrate the armature; and
a diaphragm vibrated by the armature; wherein
the driving mechanism has a first magnet facing a first surface of the armature, a second magnet facing a second surface of the armature, and a yoke configured to hold the first magnet and a second yoke,
the armature has a free end coupled to the diaphragm via a transmission body, and
a magnetized surface of the first magnet, the magnetized surface facing the armature, and a magnetized surface of the second magnet, the magnetized surface facing the armature, have different magnetic poles, a non-magnetic protective layer that has a width that is larger than a width of the armature and formed on at least a top edge of the free end of each armature on at least part of each of the magnetized surfaces.

2. The sound production device according to claim 1, wherein:
the armature is capable of maintaining a neutral attitude distant from the two magnetized surfaces with an elastic force of the armature itself; and
a thickness of the protective layers is determined so that when the armature comes into contact with either of the protective layers, a force with which the armature returns to the neutral position with the elastic force is larger than a force with which the magnet attracts the armature.

3. The sound production device according to claim 1, wherein each magnetized surface has a top edge facing the free end of the armature and a rear edge facing the bottom side of the armature, the protective layers being disposed within a predetermined range starting from the top edge in a backward direction.

4. The sound production device according to claim 1, wherein the protective layer is a resin layer.

5. The sound production device according to claim 1, wherein the protective layer provided on the magnetized surface of the first magnet and the protective layer provided on the magnetized surface of the second magnet are colored in different hues.

6. The sound production device according to claim 1, wherein the protective layers are formed in a whole region from a top edge to a rear edge of the magnetized surfaces.

* * * * *